United States Patent [19]
Dobry

[11] Patent Number: 4,756,915
[45] Date of Patent: Jul. 12, 1988

[54] PROCESS FOR PREPARING A BREWED BEVERAGE

[75] Inventor: Reuven Dobry, Stamford, Conn.

[73] Assignee: Tetley, Inc., Shelton, Conn.

[21] Appl. No.: 36,089

[22] Filed: Apr. 9, 1987

[51] Int. Cl.[4] .............................. A23F 3/18; A23F 5/26
[52] U.S. Cl. ...................................... 426/234; 426/241; 426/433; 426/435; 426/84
[58] Field of Search ................................... 426/77–84, 426/234, 241, 243, 433, 435; 219/10.55 E, 10.55 M

[56] References Cited

U.S. PATENT DOCUMENTS

| | | | |
|---|---|---|---|
| 1,428,046 | 9/1922 | Mock | 99/287 |
| 2,022,467 | 11/1935 | Heyman | 426/78 |
| 2,123,054 | 7/1938 | Lamb et al. | 426/80 |
| 2,147,831 | 2/1939 | Doble | 426/81 |
| 2,157,656 | 5/1939 | Doble | 426/77 |
| 2,187,417 | 1/1940 | Doble | 426/81 |
| 2,285,113 | 6/1942 | Eaton | 99/287 |
| 2,291,278 | 7/1942 | Cleaves | 426/82 |
| 2,377,118 | 5/1945 | Weisman | 426/120 |
| 2,495,435 | 1/1950 | Welch | 426/234 |
| 2,601,067 | 6/1952 | Spencer | 99/287 |
| 2,962,201 | 11/1960 | Brillis et al. | 426/112 |
| 3,108,881 | 10/1963 | Shaw et al. | 426/234 |
| 3,348,469 | 10/1967 | Kasakoff | 99/320 |
| 3,384,492 | 5/1968 | Spencer | 426/80 |
| 3,517,604 | 6/1970 | Coors | 99/323 |
| 3,797,642 | 3/1974 | Dobry | 426/82 |
| 3,809,215 | 5/1974 | Dobry | 426/82 |
| 3,935,318 | 1/1976 | Mihailide | 426/80 |
| 4,211,156 | 7/1980 | Zimmermann | 426/80 |
| 4,278,691 | 7/1981 | Donarumma et al. | 426/80 |
| 4,345,512 | 8/1982 | Moore | 99/287 |
| 4,386,109 | 5/1983 | Bowen et al. | 426/241 |
| 4,577,080 | 3/1986 | Grossman | 426/241 |
| 4,642,443 | 2/1987 | Jorgensen et al. | 219/10.55 E |

FOREIGN PATENT DOCUMENTS

| | | | |
|---|---|---|---|
| 734798 | 5/1966 | Canada | 426/84 |
| 0177281 | 4/1986 | European Pat. Off. | |

*Primary Examiner*—Steven Weinstein
*Attorney, Agent, or Firm*—St. Onge Steward Johnston & Reens

[57] ABSTRACT

A process for preparing a brewed beverage is presented. The process comprises providing a porous pouch containing an infusible material; at least partially immersing the pouch in water in a container; and subjecting the container to microwave heating under conditions effective to heat the water and to cause pulsation of the pouch.

25 Claims, 5 Drawing Sheets

PROCESS FOR PREPARING A BREWED BEVERAGE

TECHNICAL FIELD

The present invention relates to a process for preparing a brewed beverage such as coffee or tea and to a pouch used in the process. The process and the pouch improve the preparation of the brewed beverage in a microwave oven.

With the development of microwave ovens and subsequent advancements which have allowed for the use of such microwave ovens for ordinary household applications, the need has arisen for the production of foods and beverages which can be quickly and conveniently prepared in a microwave oven. Enormous effort and large sums of money have been expended in the "race" to develop such products and capture what is thought to be a lucrative potential market for microwavable goods.

Unfortunately, although many microwavable foods and beverages have been developed, ranging from microwave meals or sandwiches to microwave popcorn, the development of a process and a coffee or tea containing brewing pouch for producing an acceptable-tasting cup of coffee or tea using a microwave oven has eluded the skilled practitioner.

BACKGROUND ART

Of course, it will be recognized that the production of a tea-containing bag known in the art. Exemplary of such disclosures is U.S. Pat. No. 2,498,197 to Baxter which discloses a tea bag formed of a permeable web of filter material adapted to hold a quantity of tea. In a similar vein, U.S. Pat. No. 2,838,400 to Wardell discloses an infusion bag formed of an envelope shaped bag of liquid pervious material.

It is also known to produce a bag for the production of a coffee brew. For instance, Beck, in U.S. Pat. No. 3,607,302 teaches the production of a teabag-like assembly formed of a porous paper envelope containing a premeasured amount of ground coffee beans, for brewing an individual cup of coffee. Similarly, in U.S. Pat. No. 3,879,565 Einstman et al. disclose the production of a coffee brewing bag which contains an defoaming agent to disperse foam generated in the bag.

None of these references, though, teaches the use of such brewing bags in a microwave oven to produce the desired brewed beverage.

Various apparatus for making a brewed beverage using a microwave oven are known. For instance, U.S. Pat. No. 4,104,957 to Freedman et al. discloses a drip-type coffee maker which is used in a microwave oven. The coffee maker comprises a reservoir, a container which holds coffee grounds and a pot for collecting water which passes from the reservoir through the coffee grounds. Similarly, Koral, in U.S. Pat. No. 4,381,696, discloses a coffee maker comprising a water reservoir, a coffee grounds basket and a pitcher to receive brewed coffee from the coffee grounds basket. Bowen et al. discloses a microwave expresso coffee maker in U.S. Pat. No. 4,386,109. The Bowen et al. coffee maker comprises a reservoir, a collar which includes a strainer which presses against a layer of coffee grounds, and a pot into which the brewed coffee passes.

Although the above-described apparatus are reasonably effective when a pot of of the brewed beverage is desired, each are at a severe disadvantage and are extremely inconvenient when a single cup of of the beverage is desired.

European Patent Application No. 0 177 281 to Clausi et al. discloses a coffee bag which may be used in a microwave oven to brew a single cup of coffee. This patent application describes the frequent necessity of dunking and squeezing the bag in order to obtain an acceptable-tasting cup of coffee.

In U.S. Pat. No. 4,345,512 to Moore, a container which may be used to produce a cup of tea in a microwave oven is disclosed. The container has an internal compartment having perforations for steeping of tea leaves and for buoyancy, and is formed of a microwave transparent plastic material. Use of the container involves handling of loose tea leaves and manipulation of the discrete container parts, which can be an inconvenient procedure to be undertaken.

The state of the art thus indicates the need for a process able to conveniently make a single cup of a brewed beverage in a microwave oven without resort to inconvenient procedures and also without the disadvantageous dunking or squeezing steps, and, in many cases, with a significant savings of time.

DISCLOSURE OF INVENTION

The present invention relates to a process and a pouch for the preparation of a brewed beverage. The process involves providing a porous pouch containing an infusible material; at least partially immersing the pouch in water in a container; and subjecting the container to microwave heating under conditions effective to heat the water and to cause pulsation of the pouch. By "pulsation" is meant cyclical expansion and contraction of the pouch. The pouch is formed of a material which exhibits a porosity which promotes steam buildup in the pouch and yet does not substantially hinder the free flow of extract from the infusible material and/or water.

DESCRIPTION OF THE DRAWINGS

The present invention will be better understood and its advantages more apparent in view of the following detailed description, especially when read with reference to the appended drawings, wherein:

FIG. 1a is a cross-sectional view of the brewing pouch of FIG. 1 taken along lines 1a—1a;

FIG. 2 is a side, cross-sectional view of a brewing pouch of this invention disposed in water in a suitable container in the contracted state during the pulsation cycle and in position in the cavity of a microwave oven;

DETAILED DESCRIPTION OF THE PREFERRED EMBODIMENT

Figure 1:
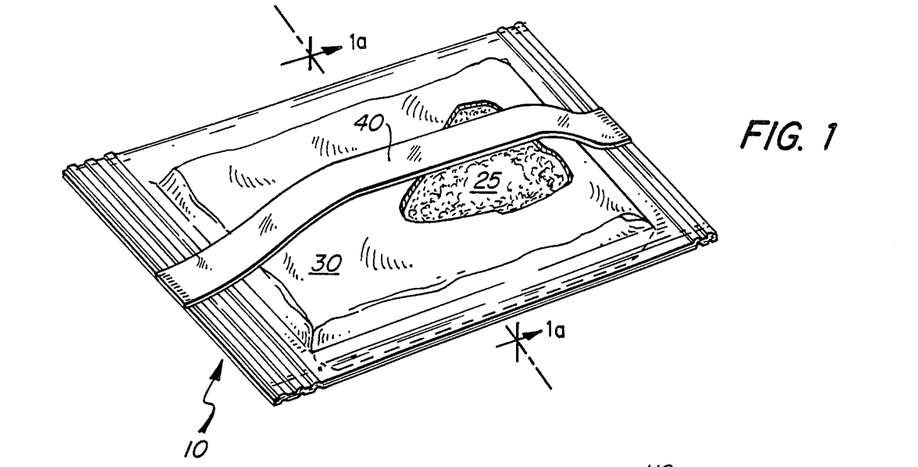
FIG. 1 is a partially broken away isometric view of one embodiment of a brewing pouch according to this invention.
Figures 1A, 2:
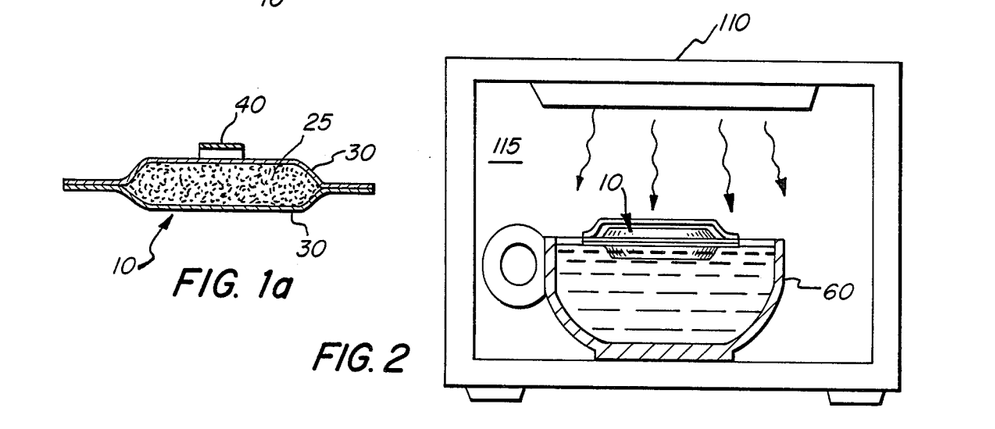

A pouch suitable for use in the present invention, as illustrated in FIGS. 1 and 1a, should advantageously be made of a material 30 which, although generally porous, is of a relatively tight-weave structure, meaning that the material should exhibit a porosity which promotes steam buildup in the pouch and yet does not substantially hinder the free flow of extract from the infusible material and/or water. Preferably, material 30 should exhibit a porosity of no greater than about 250 cubic feet per minute ($ft^3$/min.) of air per square foot of surface area (air/$ft^2$) at 0.5 inches of water pressure as measured by a Gurley permeometer in order to facilitate the desired pulsation, or cyclical expansion and contraction, effect, as will be described in more detail below. Most preferably, the material 30 should exhibit a porosity of about 100 to about 220 $ft^3$min. of air/$ft^2$ at 0.5 inches of water pressure.

Desirably, material 30 used to form the pouch 10 comprises a hydrophobic material to provide the desired porosity characteristics. The most preferred hydrophobic material for this purpose is polypropylene, although the skilled artisan will recognize the usefulness of other hydrophobic materials, such as polyvinylchloride, polyethylene and blends thereof. In fact, substantially any filter paper having the appropriate porosity characteristics can be used, with heat sealable materials being most preferred, to facilitate pouch formation.

As illustrated in FIGS. 1 and 1a, the pouch 10 is formed so as to contain a quantity of an infusible material 25 which is to be brewed therein. As used herein, the term "infusible material" refers to the material from which the brewed beverage is intended to be made, such as ground, roast coffee or tea leaves. Additionally, the term "infusible material" refers to other flavoring materials from which a brewed beverage can be made, such as peppermint leaves.

If the brewed beverage being produced is coffee, the coffee which may be contained in the pouch 10 of this invention comprises any conventional grinds of roast coffee or blends of roast coffees. It has been found that for better extract a blend of coffee which has been in part dark roasted, as would be familiar to the skilled artisan, is preferred. As is expected, the finer the grind of the coffee, the greater the amount of cup solids when a coffee brew is prepared with it. The choice of fineness of grind is, thus, a matter of compromise between the desire to maximize cup solids and the willingness to tolerate the sediment in the cup at any specific porosity of the pouch material. For reasons not fully understood, but presumed to be blinding of the pouch material by increasing amounts of fines and the higher incidence of surface coffee oils, extremely fine grinds (for instance 100% at less than 50 mesh) seem to result in diminishing returns of increased cup solids.

Additionally, the skilled artisan will recognize that soluble coffee can also be used to comprise at least partially the coffee used in pouch 10. The amount of soluble coffee, if used at all, will vary according to the desired flavor and aroma characteristics of both pouch 10 and the coffee brew produced by use of pouch 10 in the process of this invention. Moreover, aromatized coffees, whether soluble or roast, ground coffee, may also be used in the process of this invention, either to provide desired aroma to pouch 10 or to the brewed coffee, or both.

The amount of coffee which is contained in pouch 10 will vary with the strength of coffee brew desired and the type of coffee or blend of coffees contained in pouch 10. The particular amounts used will be readily determinable to the skilled practitioner. Generally, the amount of coffee or coffee blend in pouch 10 will be about 4 grams to about 10 grams, with variations within that range being according to individual taste and preference.

If the brewed beverage to be produced is tea, the tea substrate contained in pouch 10 of this invention can be prepared from the dried leaves, leaf buds and/or internodes of a tea plant or shrub, cured by one of several recognized methods, classed according to the method of manufacture, such as green, black or oolong, and graded according to leaf size, such as congou, orange pekoe, pekoe or souchong. Also included are the leaves, leaf buds and/or internodes of any of numerous plants known to resemble tea plants in both appearance and properties, and known to the skilled artisan for producing more exotic tea beverages, such as camomille tea, rose hip tea, Darjeeling tea, Earl Grey tea, etc. Moreover, additional flavoring agents can be included with the tea leaves in pouch 10 of this invention, such as peppermint leaves, if desired and as would be familiar to the skilled artisan.

The amount of tea used in pouch 10 according to this invention will vary according to the type of tea used and the strength desired by the consumer. Typically, the amount of tea in pouch 10 will vary from about 1 gram to about 4 grams, as would be known to the skilled artisan. When larger quantities of tea are being made, such as when iced tea is desired, pouch 10 can contain up to about 16 grams of tea, preferably about 12 grams to about 16 grams of tea.

Additionally, the skilled artisan will recognize that soluble tea can also be used to comprise at least partially the tea used in pouch 10. The amount of soluble tea, if used at all, will vary according to the desired flavor and aroma characteristics of both pouch 10 and the tea brew produced by use of pouch 10 in the process of this invention. Moreover, sweetened, aromatized or flavored teas, whether soluble or not, may also be used in the process of this invention, either to provide desired aroma to pouch 10 or to the brewed tea, or both, or to add increased flavor to the brewed tea.

The pouch 10 of this invention can be prepared according to methods conventional in the art. For instance, pouch 10 can be prepared according to the method disclosed by Goedert in U.S. Pat. No. 4,609,556 or the method of U.S. Pat. No. 4,262,473 to Brooke, the disclosures of each of which are incorporated herein by reference. Preferably, the pouch is prepared and sealed, preferably following gas sparging as discussed below, within a substantially air-tight outer bag and provided to consumers in this form. In this way, the pouch can be maintained in a relatively oxygen-free environment (i.e., no more than about 2% oxygen) during storage to prevent oxidation of the infusible material, which leads to taste spoilage. For use, the consumer opens the outer bag and can now utilize the pouch of this invention.

Figure 4:
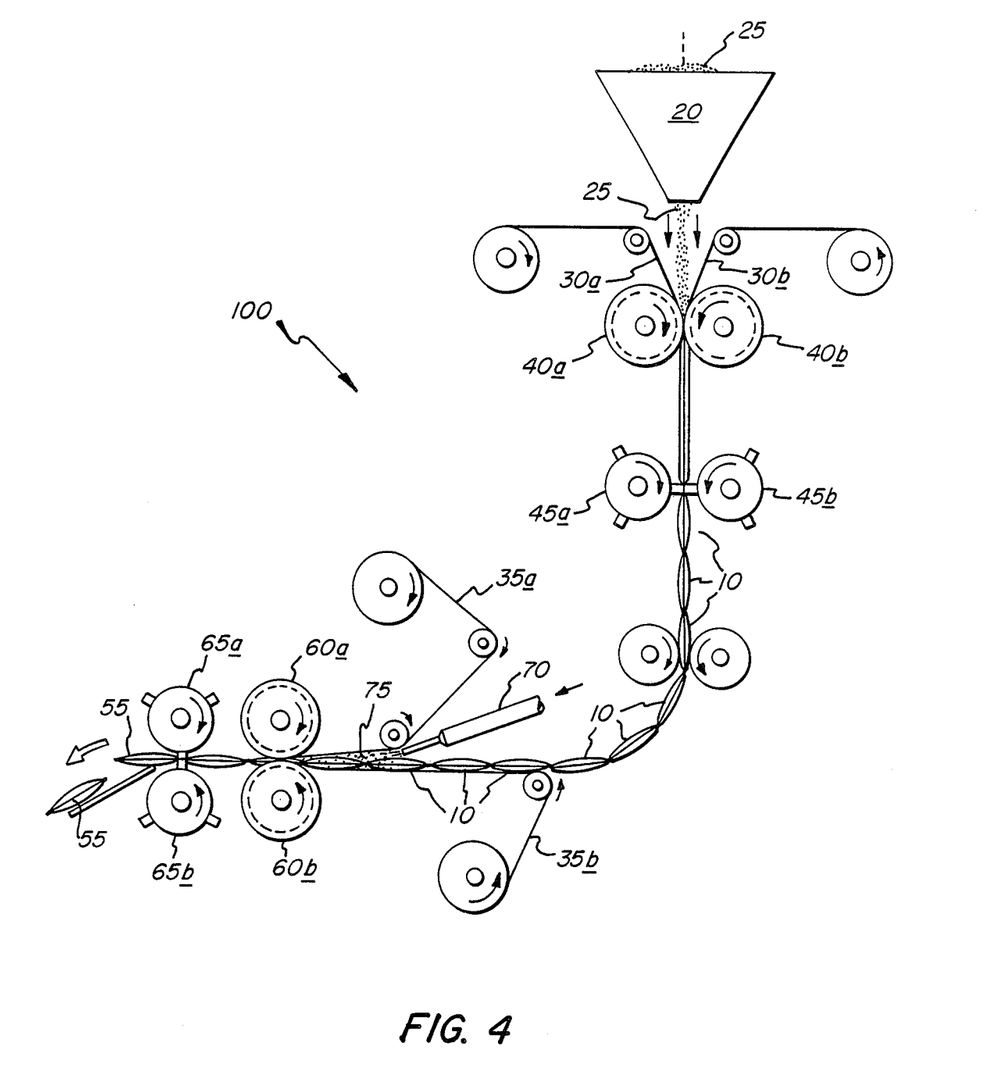
FIG. 4 is a schematic representation of one embodiment of an apparatus for producing a microwavable brewing pouch of the present invention and disposing the pouch in a protective outer bag.

A preferred apparatus and method for the preparation of pouch 10 of this invention and disposing the pouch in an outer bag as described above is illustrated in the schematic diagram of FIG. 4. Such a method involves feeding infusible material 25, such as ground, roast coffee, or dried tea leaves, from a suitable hopper 20 to a pouch-former 100 comprising opposing lengths of webs 30a and 30b of appropriate porous material, such as polypropylene, or other heat sealable filter paper, as discussed above, supplied by conventional web sources, such as rolls (not shown), and forming pouch 10 of this invention. Of course, the amount of infusible material 25 fed to apparatus 100 is metered to provide the desired amount of infusible material to each pouch. Opposing lengths of web 30a and 30b have their sides sealed to each other by appropriate side sealer means such as sealing rollers 40a and 40b and pouches 10 are formed by sealing the ends by appropriate means such as by end seal rollers 45a and 45b. The thusly formed pouch 10 can then have a layer of air-tight material 35a and 35b provided on either side thereof and the pouch-containing outer bag 55 formed using side sealer means 60a and 60b and end sealer 65a and 65b, means as described above. Sparging nozzles 70 can be disposed in appropriate locations to sparge the interior of the outer bag with nitrogen (N₂) 75 or any other inert gas prior to end-sealing outer bag 55 in order to establish a relatively oxygen-free environment for pouch 10 of this invention.

Additionally, in preparing pouch 10 of this invention, pouch 10 can be provided with a tape 40, such as a mylar tape, to use as a handle for the pouch, as illustrated in FIG. 1. Tape 40 can be applied to pouch 10 by conventional means, such as by heat sealing means, to allow the consumer to use pouch 10 to prepare a cup of coffee or tea, for instance, without requiring the consumer to handle the pouch directly. Moreover, the pouch-containing outer bag 55 can be prepared with a slit to facilitate opening of outer bag 55 for access to pouch 10. The slit can be formed in outer bag 55 by conventional slitting means.

To prepare a brewed beverage using pouch 10 of this invention, pouch 10 is at least partially immersed in water in a suitable container, such as a microwave-transparent cup or mug 60, as illustrated in FIG. 2. The amount of water can vary depending on the individual consumer's desires, including the strength of the beverage desired, and should preferably be about 4 ounces to about 10 ounces and, when a concentrate is being prepared for the preparation of larger quantities of the brewed beverage, as discussed in more detail below, the amount of water in container 60 can be up to about 14 ounces. Most preferably, container 60 should contain about 5 ounces to about 8 ounces of water. It is not necessary in the practice of the present invention to ensure that pouch 10 is totally immersed in the water, as will be seen below, although total immersion is generally preferred.

Figure 3:
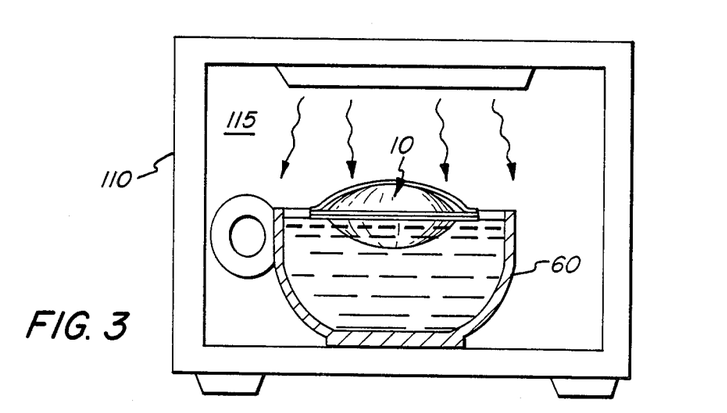
FIG. 3 is a side, cross-sectional view of the brewing pouch of this invention disposed in water in a suitable container in the expanded state during the pulsation cycle and in position in the cavity of a microwave oven.

The water- and pouch-containing container is then subjected to microwave heating under conditions effective to heat the water and to cause pulsation of the pouch. Generally, a microwave oven 110 comprises a cavity 115 with a door (not shown) for ingress and egress, and a magnetron (not shown) which supplies microwave energy into the cavity via a waveguide (not shown). Most common household microwave ovens operate at a frequency of about 2450 megahertz and a wavelength of about 12.2 cm. Other frequencies, such as about 915 megahertz with a wavelength of about 33 cm., are also commonly employed. The amount of power employed may be as little as about 400 watts for household cooking and as much as about 2000 watts for some catering ovens. Generally, most household microwave ovens operate at a frequency of about 2450 megahertz and use about 500 to about 750 watts.

Advantageously, the water is heated in microwave oven 110 to a degree appropriate for the particular brewed beverage being produced. Typically, such as when coffee or tea is being made, the desired water temperature is about 170° F. to about 210° F., preferably about 180° F. to about 200° F. for most applications.

The conditions effective to cause pulsation (i.e., cyclical expansion and contraction) of pouch 10 are preferably those wherein microwave oven 110 is used at less than full power. Conventional wisdom, based on traditional coffee brewing experiences, suggest the usage of maximum and steady microwave power to achieve high water temperature and, presumably, greater extraction in the shortest time possible. However, it has now been found that microwaving at less than full power (full power being often represented by the high setting on conventional microwave ovens), produces significant and unexpected benefits, with but a minor and relatively inconsequential extension of brewing time. Most preferably, microwave oven 110 is used at about 75% to about 85% of full power (often represented by the medium-/high setting on a conventional microwave oven). Although the reasons why the pulsation effect is caused by using the microwave oven at less than full power are not completely understood, it is believed that the microwave energy is focused on the infusible material when wet. At less than full power, the magnetron is producing microwave energy in a pulsating or on-off fashion. As the microwave energy is being focused on the wet infusible material, steam buildup in the pouch occurs. This steam buildup causes pouch 10 to expand and leads to expulsion of water and extract, as illustrated in FIG. 3. When the microwave energy is off during the pulsation of the magnetron, the steam condenses in pouch 10 which leads to pouch contraction and a return of water into pouch 10, as illustrated in FIG. 2. This pulsation of pouch 10 simulates a dunking action which alternates in the pouch with brewing. Through this effect, use of pouch 10 of this invention leads to production of a drinking strength brewed beverage practically without the necessity for dunking or squeezing the pouch.

It has been found that, when coffee is being produced according to the process of this invention, the coffee has a solids content closely approaching that of commonly prepared coffees, i.e., about 0.8% to about 1.2% solids, without dunking or squeezing. As is known to the skilled artisan, percent solids is a clear indication of the richness and flavor of coffee.

Furthermore, it has been found that the process of this invention can produce an iced beverage such as tea in larger quantity amounts (i.e., one half-gallon amounts) significantly quicker than by conventional methods or by microwave methods using full power. The reason for this is through the ability to produce a concentrate which can be diluted to produce a larger quantity of the beverage. The concentrate can be produced with the substantial elimination of the requirement to steep the tea for some time after heating of the water to the desired temperature. The need for steeping is eliminated through the pulsation effect of pouch 10, which creates the same effect as steeping.

BEST MODE FOR CARRYING OUT THE INVENTION

The following examples illustrate the ability of the process of this invention to prepare a brewed beverage which is superior to those prepared according to prior art methods. Although illustrative of the present invention, the examples should not be considered in any way limiting thereof.

Figure 5:
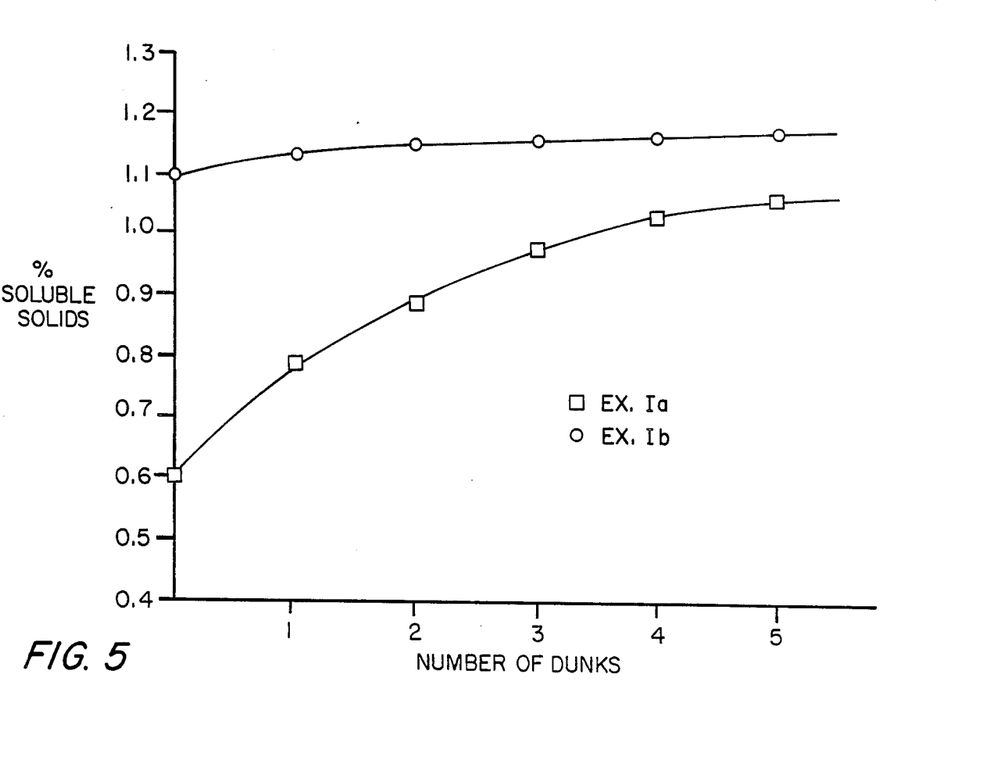
FIG. 5 is a graphic representation of the results of Example I.

EXAMPLE I a. A microwave coffee pouch is prepared according to this invention. The pouch is formed of a polypropylene fiber composition having a porosity of 200 ft³min. of air/ft² at 0.5 inches of water pressure and contains 9 grams of ground coffee. The thusly prepared pouch is placed in a container having 7.1 ounces of water at room temperature and exposed to microwave radiation at 80% (of 600 watts) power for 3 minutes and 12 seconds to bring the brew to a drinking temperature. The percent solids are measured freshly brewed (undunked) and after each of five dunks and the results graphically reproduced in FIG. 5.

b. A microwave coffee pouch is prepared and brewed as described above in Example Ia, except that it is exposed to microwave radiation at 100% power (600 watts) for 2 minutes and 22 seconds, to bring the water to the same temperature range. The percent solids are measured freshly brewed (undunked) and after each of five dunks and the results graphically reproduced in FIG. 5.

It will readily be observed that the process of this invention, using less than full microwave power, provides a cup of coffee having a higher percent solids without dunking than a process using full microwave power after five dunks. The total brewing period needs to be extended only to compensate for the "off" periods during the microwave power cycle.

EXAMPLE II a. A microwave coffee pouch is prepared according to this invention. The pouch is formed of a polypropylene fiber composition having a porosity of 200 ft³/min. of air/ft² at 0.5 inches of water pressure and contains 9 grams of ground coffee. The thusly prepared pouch is placed in a container having 7.8 ounces (230 cc.) of water at 63° F. and exposed to microwave radiation at 100% (steady) power for 2 minutes and 25 seconds in a commercial microwave oven to bring the water to a temperature of 195° F. The percent solids are measured freshly brewed (undunked) and after each of five dunks and the results graphically reproduced in FIG. 6.

b. A microwave coffee pouch is prepared and brewed as described above, except that it is exposed to microwave radiation at 100% (steady) power for 3 minutes, to bring the water to a temperature of 197° F. Included with the container in the microwave is 180 grams of coffee which acts as an energy absorber sufficient to reduce the microwave energy to which the cup is exposed to 80% power. The percent solids are measured freshly brewed (undunked) and after each of five dunks and the results graphically reproduced in FIG. 6.

c. A microwave coffee pouch is prepared and brewed as described above, except that it is exposed to microwave radiation at 80% (on-off) power for 3 minutes, to bring the water to a temperature of 198° F. The percent solids are measured freshly brewed (undunked) and after each of five dunks and the results graphically reproduced in FIG. 6.

Figure 6:
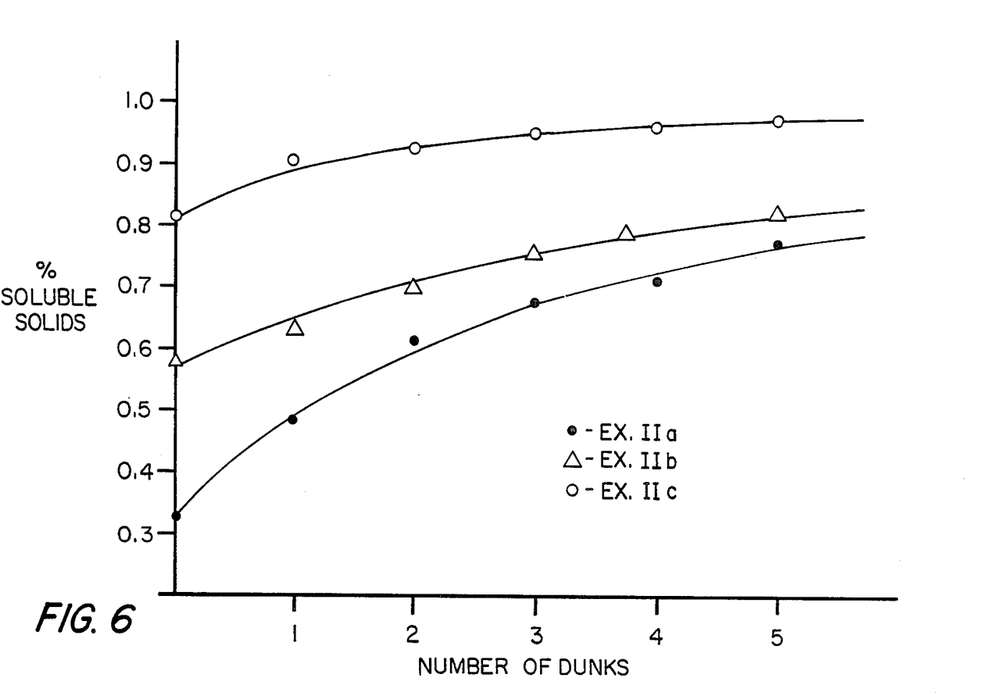
FIG. 6 is a graphic representation of the results of Example II.

It will readily be observed that use of microwave radiation at less than full power according to this invention is important due to the pulsation effect, not the level of power, the brewing time or the final temperature. When exposed to 80% power without pulsation, substantially lower solids are obtained, as illustrated in FIG. 6.

EXAMPLE III

Figure 7:
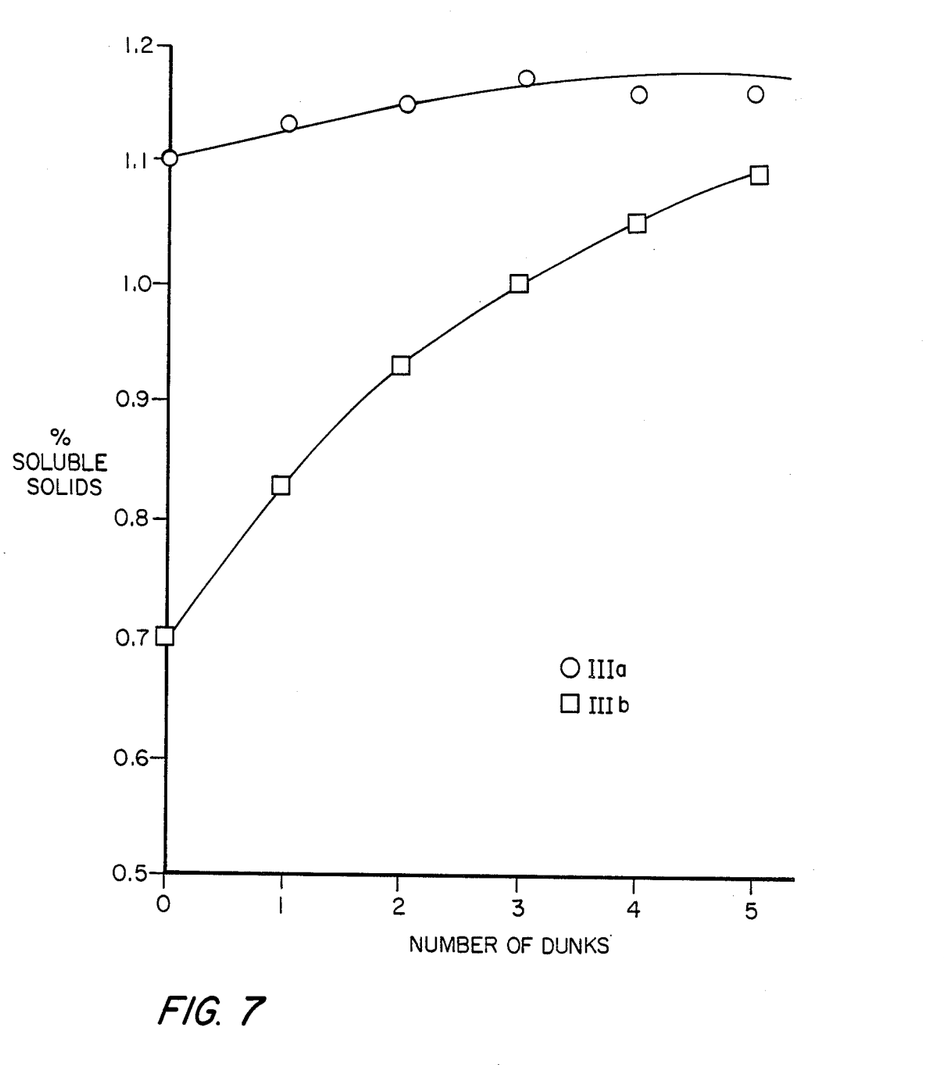
FIG. 7 is a graphic representation of the results of Example III.

Two microwave coffee pouches are prepared according to this invention. The pouches are formed of a heavy duty filter paper with a heat sealing layer consisting of vinyon (predominantly polyvinyl chloride) blended with polyethylene having a porosity of 115 ft³/min. of air/ft² at 0.5 inches of water pressure and contain 9 grams of ground coffee. One of the thusly prepared pouches (IIIa) is brewed under the conditions described in Example Ia. Another pouch (IIIb) is brewed under the conditions described in Example Ib. The results are graphically reproduced in FIG. 7.

EXAMPLE IV

Figure 8:
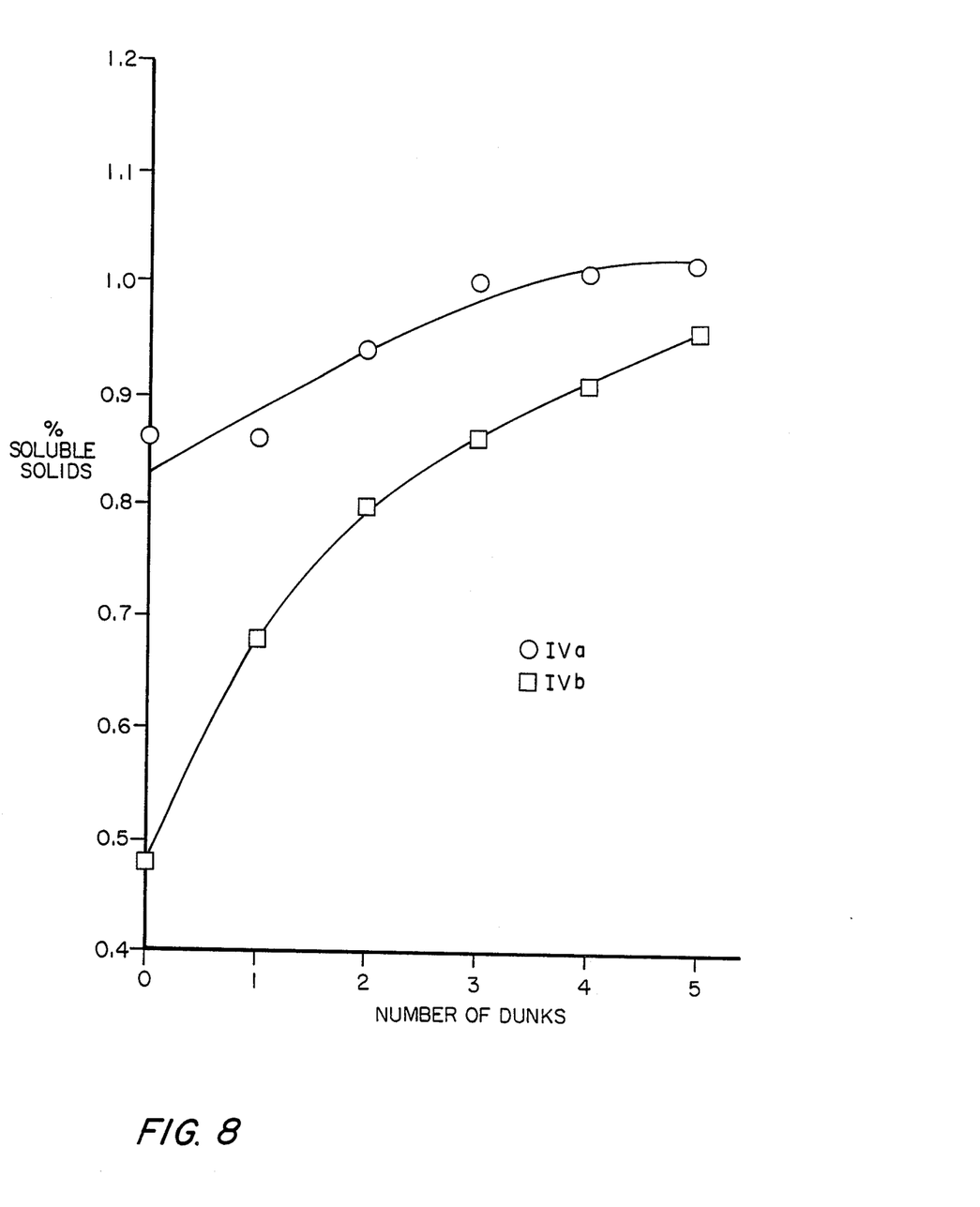
FIG. 8 is a graphic representation of the results of Example IV.

Two microwave coffee pouches are prepared according to this invention. The pouches are formed of a light (perforated) filter paper with a heat sealing agent consisting of vinyon (predominantly polyvinyl chloride) blended with polyethylene having a porosity of 290 ft³/min. of air/ft² at 0.5 inches of water pressure. One pouch (IVa) is brewed under the conditions described in Example Ia. Another pouch (IVb) is brewed under the conditions described in Example Ib. The results are reproduced graphically in FIG. 8.

Reference to Examples III and IV clearly indicate, especially when compared to Examples I and II, the advantages obtainable through the use of materials within the disclosed porosity ranges in producing an acceptable-tasting cup of coffee.

EXAMPLE V a. A microwave tea pouch is prepared according to this invention. The pouch is formed of a light filter paper with a heat sealing agent consisting of vinyon (predominantly polyvinyl chloride) blended with polyethylene having a porosity of 180 ft³/min. of air/ft² at 0.5 inches of water pressure and contains 2.25 grams of orange pekoe and pekoe cut black tea. The thusly prepared pouch is placed in a container having 5.1 ounces (150 cc) of water at room temperature and exposed to microwave radiation at medium/high setting in a 500 watt conventional microwave oven for three minutes (until an acceptable temperature was reached). The color and temperature of the brew is measured after 2 minutes, 2.5 minutes and 3 minutes, and the results are shown in Table 1.

TABLE 1

| Time (min.) | Temperature (°F.) | Color[1] |
|---|---|---|
| 2.0 | 170 | 85 |
| 2.5 | 175 | 72 |
| 3.0 | 190 | 55 |

[1]color is measured as percent absorbance at 550 nm; the lower the number, therefore, the darker the color.

b. A microwave tea pouch is prepared and brewed as described above in Example Va, except that it is exposed to microwave radiation at the high setting for 2 minutes (until an acceptable temperature is reached). The temperature and color is measured after 2 minutes, and the results are shown in Table 2.

TABLE 2

| Time (min.) | Temperature (°F.) | Color[1] |
| --- | --- | --- |
| 2.0 | 185 | 73 |

[1] color is measured as percent absorbance at 550 nm; the lower the number, therefore, the darker the color.

c. Approximately 7.1 ounces of water is brought to a boil. Prior to that, a tea pouch is prepared by forming a pouch of a light filter paper with a heat sealing agent consisting of vinyon (predominantly polyvinyl chloride) blended with polyethylene having a porosity of 180 ft$^3$/min. of air/ft$^2$ at 0.5 inches of water pressure and contains 2.25 grams of orange pekoe and pekoe cut black tea. The boiling water is poured over the pouch into a container, and the pouch and container are left to steep for 5 minutes (until an acceptable brew is reached). The temperature and color are measured after 2 minutes, 3 minutes, 4 minutes and 5 minutes, and the results shown in Table 3.

TABLE 3

| Time (min.) | Temperature (°F.) | Color[1] |
| --- | --- | --- |
| 2.0 | 180 | 86 |
| 3.0 | 175 | 80 |
| 4.0 | 172 | 78 |
| 5.0 | 170 | 73 |

[1] color is measured as percent absorbance at 550 nm; the lower the number, therefore, the darker the color.

It will readily be observed that the practice of this invention produces tea of quality far superior to prior art methods. As compared to standard microwave methods, the tea produced by this invention produces tea having substantially darker color, and as compared to conventional steeping methods, the tea produced by this invention is substantially darker in substantially shorter time (without even considering the time required to boil the water in the conventional steeping method).

EXAMPLE VI

A microwave tea pouch is prepared according to this invention. The pouch is formed of a light filter paper with a heat sealing agent consisting of vinyon (predominantly polyvinyl chloride) blended with polyethylene having a porosity of 115 ft$^3$/min. of air/ft$^2$ at 0.5 inches of water pressure and contains 14.2 grams of orange pekoe and pekoe cut black tea. The pouch is placed in a 64 ounce container with 12 ounces of water at 130° F. and exposed to microwave radiation at the medium/high setting in a conventional 500 watt microwave oven for 5.5 minutes until the water is at a temperature of about 198° F. The resulting tea concentrate is then diluted to 64 ounces with water and the color and turbidity of the tea is measured and the results are shown in Table 4 as Run 1.

A pouch is prepared and treated as discussed above, except that it is exposed to microwave radiation at the high setting in a conventional 500 watt microwave oven for 4 minutes. The brew is then allowed to steep for an additional 5 minutes. The resulting tea concentrate is then diluted to 64 ounces with water and the color and turbidity of the tea is measured and the results are shown in Table 4 as Run 2.

TABLE 4

| Run | Turbidity[1] | Color[2] |
| --- | --- | --- |
| 1 | 272 | 59.9 |
| 2 | 303 | 59.8 |

[1] turbidity is measured as percent scattered light; the higher the number, therefore, the more turbid the brew
[2] color is measured as percent absorbance at 550 nm; the lower the number, therefore, the darker the color.

It can be readily observed that the process of this invention will produce a brewed beverage in substantially less time with equivalent color and less turbidity.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

I claim:

1. A process for preparing a brewed beverage, the process comprising:
    a. providing a pouch exhibiting a porosity which promotes steam buildup in said pouch and yet does not substantially hinder the free flow of extract from an infusible material and/or water, said pouch containing an infusible material;
    b. at least partially immersing said pouch in water in a container; and
    c. subjecting said container to microwave heating sufficient to heat said water and to cause pulsation of said pouch to provide a drinking strength brewed beverage.
2. The process of claim 1 wherein said microwave heating is at less than full power.
3. The process of claim 2 wherein said microwave heating is at about 75% to about 85% of full power.
4. The process of claim 2 wherein said pouch exhibits a porosity of no greater than about 250 ft$^3$/min. of air/ft.$^2$ at 0.5 inches of water pressure.
5. The process of claim 4 wherein said pouch exhibits a porosity of about 100 to about 220 ft$^3$/min. of air/ft$^2$ at 0.5 inches of water pressure.
6. The process of claim 1 wherein said pouch is comprised of a hydrophobic material.
7. The process of claim 6 wherein said hydrophobic material has heat sealing characteristics.
8. The process of claim 7 wherein said hydrophobic material comprises polypropylene.
9. The process of claim 1 wherein said water is heated to about 170° F. to about 210° F.
10. The process of claim 1 wherein said infusible material comprises roast ground coffee.
11. The process of claim 10 wherein said container contains about 5 ounces to about 8 ounces of water.
12. The process of claim 11 wherein said pouch contains about 4 grams to about 10 grams of coffee.
13. The process of claim 1 wherein said infusible material comprises tea.
14. The process of claim 13 wherein said container contains about 5 ounces to about 14 ounces of water.
15. The process of claim 14 wherein said pouch contains about 1 gram to about 4 grams of tea.
16. The process of claim 14 wherein said pouch contains about 12 to about 16 grams of tea.
17. A process for preparing a brewed beverage, the process comprising:

a. providing a pouch having a porosity of no greater than about 250 ft³/min. of air/ft.² at 0.5 inches of water pressure, and containing about 4 grams to about 10 grams of roast, ground coffee or about 1 gram to about 4 grams of tea;

b. at least partially immersing said pouch in about 5 ounces to about 8 ounces of water in a container; and c. subjecting said container to microwave heating at less than full power sufficient to heat said water and to cause pulsation of said pouch to provide a drinking strength brewed beverage 18. The process of claim 17 wherein said pouch exhibits a porosity of about 100 to about 220 ft³/min. of air/ft² at 0.5 inches of water pressure.

19. The process of claim 17 wherein said pouch is comprised of a hydrophobic material.

20. The process of claim 19 wherein said hydrophobic material has heat sealing characteristics.

21. The process of claim 20 wherein said hydrophobic material comprises polypropylene.

22. The process of claim 17 wherein said water is heated to about 170° F. to about 210° F.

23. The process of claim 17 wherein said microwave heating is at about 75% to about 85% of full power.

24. A process for preparing a brewed beverage comprising:

a. providing a pouch formed of a hydrophobic material having a porosity of about 100 to about 220 ft³/min. of air/ft² at 0.5 inches of water pressure and containing about 4 grams to about 10 grams of roast, ground coffee or about 1 gram to about 4 grams of tea;

b. at least partially immersing said pouch in about 5 ounces to about 8 ounces of water in a container; and c. subjecting said container to microwave heating at about 75% to about 85% power sufficient to heat said water to about 170° F. to about 210° F. and to cause pulsation of said pouch to provide a drinking strength brewed beverage.

25. The process of claim 24 wherein said hydrophobic material comprises polypropylene.

* * * * *